United States Patent [19]
Gagel et al.

[11] Patent Number: 5,384,140
[45] Date of Patent: Jan. 24, 1995

[54] PROCESS FOR PREPARING TENDER, JUICY MICROWAVEABLE MEAT

[75] Inventors: Simon Gagel, Forest Hills; ShiowShuh Sheen, New Hyde Park; John Moyer, Garden City, all of N.Y.

[73] Assignee: DCA Food Industries, Inc., Garden City, N.Y.

[21] Appl. No.: 986,676

[22] Filed: Dec. 8, 1992

[51] Int. Cl.⁶ .................. A23L 1/314; A23L 1/315; A23L 1/318
[52] U.S. Cl. .................. 426/243; 426/281; 426/289; 426/296; 426/641
[58] Field of Search .............. 426/243, 281, 289, 296, 426/641, 652

[56] References Cited

U.S. PATENT DOCUMENTS

| | | | |
|---|---|---|---|
| 4,224,349 | 9/1980 | Gooch et al. | 426/641 X |
| 4,518,618 | 5/1985 | Hsia ewt al. | 426/243 X |
| 4,675,197 | 6/1987 | Banner et al. | 426/243 X |
| 4,746,522 | 5/1988 | Wofford et al. | 426/243 |
| 5,164,213 | 11/1992 | Bonkowski | 426/641 X |

*Primary Examiner*—Arthur L. Corbin
*Attorney, Agent, or Firm*—Amster, Rothstein & Ebenstein

[57] ABSTRACT

In a process for preparing a coated microwaveable meat which will be juicy and tender after microwave cooking, the meat is intimately contacted with an aqueous solution having a pH of 5.0–9.0 and a cation normality ratio of $Na^+/K^+/Ca^{++}$ of 2–10/1–6/1–4, the contact continuing until the water gain in the meat is at least 8% of the initial weight of the meat. Thereafter a dry, powdery coating agent, including starch, protein and optional flavoring, is applied to the meat. During subsequent microwave cooking of the meat, the coating agent forms a starch-and-protein crosslinked continuous skin-like film which controls the heating rate and the microwave penetration depth so that microwave energy absorption is at least initially higher at the film than in the interior of the meat.

39 Claims, No Drawings

PROCESS FOR PREPARING TENDER, JUICY MICROWAVEABLE MEAT

BACKGROUND OF THE INVENTION

The present invention relates to a process for preparing a coated, microwaveable meat and, in particular, such a meat which will be juicy and tender after microwave cooking.

The microwave cooking of fibrous meat pieces (e.g., 0.5 to 10 ounces in weight) usually results in a dry end product which is not acceptable to the consumer. This is the result of the microwave cooking technique which cooks the meat pieces "from the inside out," with the moisture within the meat vaporizing as it absorbs the microwave energy to which the meat is exposed. Accordingly, the need remains for a process which will ensure that adequate moisture is retained within the tissue of the meat even after microwave cooking.

In addition to the drying of the meat during microwave cooking as a result of the inherent nature of the microwave cooking process, there is also the problem associated with "bumping". "Bumping" is an explosive release of steam due to the explosion of cell structure within the meat arising out of uneven local microwave energy absorption, so that steam pressure builds up within a cell or between cells. The noise of "bumping" is commonly heard while fibrous meat is being cooked in a microwave oven and may be frightening to the cook. "Bumping" may also result in splattering of the meat and thereby necessitate a cleaning of the microwave oven interior. Because "bumping" is indicative of uneven local microwave heating (so that local portions of the meat are subjected to higher than expected or desired temperatures), "bumping" is a contributory factor to microwave meat pieces being at least in parts dry and unacceptable to the consumer.

Accordingly, it is an object of the present invention to provide a process for preparing a coated microwaveable meat which will be juicy and tender after microwave cooking.

Another object is to provide such a process which substantially reduces or eliminates "bumping".

SUMMARY OF THE INVENTION

It has now been found that the above and related objects of the present invention are obtained in a process for preparing a coated microwaveable meat which will be juicy and tender after microwave cooking, the process comprising a "water gain" step and a subsequent "coating" step. The "water gain" step involves intimately contacting the meat with an aqueous solution having a pH of 5.0–9.0 and a cation normality ratio of $Na^+/K^+/Ca^{++}$ of 2–10/1–6/1–4, the contact continuing until the water gain in the meat is at least 8% of the initial weight of the meat. The "coating" step involves thereafter applying to the meat a dry, powdery coating agent including starch, protein and optional flavoring. During subsequent microwave cooking of the meat, the coating agent forms a starch-and-protein crosslinked continuous skin-like film which controls the heating rate and the microwave penetration depth so that microwave energy absorption is at least initially higher at the film than in the interior of the meat.

In a preferred embodiment of the "water gain" step, the aqueous solution has a pH of 5.6–7.4 and a cation normality ratio of $Na^+/K^+/Ca^{++}$ of 7.0–9.5/2.0–3.5/1.0–2.5. Preferably, the aqueous solution contains about 2–8% by weight of non-aqueous ingredients including 5–20% carrageenan, 5–30% gelatin, 8–40% phosphates, 10–80% flour and 5–35% chloride salts, based on the weight of the non-aqueous ingredients of the aqueous solution. Optimally, the aqueous solution contains about 5% by weight of non-aqueous ingredients including 8–15% carrageenan, 10–15% gelatin, 15–24% phosphates, 25–70% flour (especially rice flour) and 14–22% chloride salts, based on the weight of the non-aqueous ingredients of the aqueous solution.

In the preferred embodiment, the phosphates are 2–10% monocalcium phosphate anhydrous, 2–10% potassium tripolyphosphate, and 4–20% sodium tripolyphosphate, based on the weight of the non-aqueous ingredients of the aqueous solution (optimally 5–7% monocalcium phosphate anhydrous, 5–7% potassium tripolyphosphate, and 5–10% sodium tripolyphosphate), and the chloride salts are 3–25% sodium chloride and 2–10% potassium chloride, based on the weight of the non-aqueous ingredients of the aqueous solution (optimally 10–15% sodium chloride and 4–7% potassium chloride). The flour is rice flour and the gelatin has a bloom of at least 20. The aqueous solution may include a thickener selected from the group consisting of pectin, carboxymethylcellulose and methylcellulose.

Preferably, in the "water gain" step the meat and the aqueous solution are intimately contacted by tumbling. The meat and the aqueous solution are intimately contacted at a temperature of 0°–30° C. (optimally 0°–10° C.) for a period of 30–180 minutes (optimally 60–90 minutes) at atmospheric pressure or for a period of 5–20 minutes (optimally 10–15 minutes) under vacuum (typically −20 to −25 in. Hg).

In a preferred embodiment of the "coating" step, the starch of the coating agent is selected from the group consisting of flour, pregelled starch and combinations thereof, and the protein of the coating agent is selected from the group consisting of egg albumen, isolated vegetable protein and combinations thereof. The coating agent preferably includes by weight 10–25% egg albumen, 5–20% isolated vegetable protein, 10–30% flour, 3–15% pregelled starch, and 5–35% chloride salts, (optimally, 10–20% egg albumen, 10–15% isolated vegetable protein, 10–15% flour, 5–8% pregelled starch, and 10–25% chloride salts). The flour is selected from a group consisting of corn, wheat, soy, and rice flour and is preferably rice flour.

Preferably, in the "coating step" the coating agent is applied to the meat to achieve a 3–15% (optimally 4–6%) by weight pick-up based on the meat. The coating agent may be applied to the meat by direct contact and blowing to control the pick-up amount. The coating agent preferably has a particle size of 20–200 mesh (optimally 50–100 mesh).

The present invention additionally encompasses a process for increasing the water content of meat by intimately contacting the meat with an aqueous solution having a pH of 5.0–9.0 and a cation normality ratio of $Na^+/K^+/Ca^{++}$ of 2–10/1–6/1–4, the contact continuing until the water gain in the meat is at least 8% of the initial weight of the meat. The aqueous solution preferably contains carrageenan.

The present invention further encompasses a process for preparing a coated microwaveable meat which will be juicy and tender after microwave cooking, comprising the step of applying to the meat a dry, powdery coating agent including starch, protein and optional flavoring, whereby, during subsequent microwave cooking of the meat, the coating agent forms a starch-and-protein crosslinked continuous skin-like film which controls the heating rate and the microwave penetration depth so that microwave energy absorption is at least initially higher at the film than in the interior of the meat.

DETAILED DESCRIPTION OF THE PREFERRED EMBODIMENTS

A preferred embodiment of the process for preparing a coated microwaveable meat which will be juicy and tender after microwave cooking comprises two steps. The first step is a "water gain" step in which the meat is intimately contacted (e.g., by soaking or tumbling) with an aqueous solution of a given pH and cation normality ratio, which step results in a water gain in the meat. While it is known to increase the yield for refrigerated or frozen whole poultry and ground meat after defrosting and conventional cooking through a water gain process, such water gain processes have not been adapted for use on meat which would be subjected to subsequent microwave cooking. Such water gain processes of the prior art required either the direct injection of specially formulated liquids into the meat or a tumbling of the meat under certain vacuum conditions. By way of contrast, the present invention requires neither direct injection of fluid into the meat nor the use of vacuum conditions, although either process might be used if desired.

The second step of the preferred embodiment involves the application of a dry, powdery coating to the meat (after its water gain) so as to modify the usual microwave heating pattern. More particularly, the coating agent absorbs microwave energy faster than the interior of the meat and forms a continuous skin-like film about the meat. The skin-like film formed at the food surface during microwave heating reduces the microwave penetration depth and changes the heating rate in the entire food domain. While various coating agents have been investigated intensively in the prior art, especially for the purposes of causing the product to obtain a "browned" appearance and to assist in the retention of the moisture within the product during microwave cooking, such coating agents of the prior art result in a coating of discreet areas of the product, with no overall or continuous skin-like film being generated during the cooking process. Accordingly, the prior art coatings are only partially successful in retaining the moisture within the meat.

It will be appreciated that, while the preferred embodiment of the present invention is comprised of both steps—the "water gain" step and the "coating" step together, as set forth above—each of these steps may be employed separately for particular purposes. Thus, the "water gain" step may be employed by itself as a process for increasing the water content of meat, regardless of whether or not the meat will later be subjected to microwave cooking. Similarly, the "coating" step may be employed by itself as a process for preparing a coated microwaveable meat which will be juicy and tender after microwave cooking, especially where the meat naturally contains a high water content or even with meats of lesser water content where the "juicy and tender" standard is less strict than it is for the preferred embodiment.

Surprisingly, however, it has been found that the "water gain" step alone, using the proper ratio of cations and a controlled pH in the aqueous solution, substantially reduces or eliminates "bumping" during subsequent microwave heating, so that a quieter and cleaner cooking process is obtained as well as a more uniform and moist cooked meat.

The Water Gain Step

The aqueous solution used in the "water gain" step of the present invention has two critical characteristics as follows: a pH of 5.0–9.0 (preferably 5.6–7.4), and a cation normality ratio of $Na^+/K^+/Ca^{++}$ of 2–10/1–6/1–4 (preferably 7.0–9.5/2.0–3.5/1.0–2.5).

More particularly, the aqueous solution preferably contains about 2–8% (preferably 5%) by weight of non-aqueous ingredients. The non-aqueous ingredients include 5–20% (preferably 8–15%) carrageenan, 5–30% (preferably 10–15%) gelatin, 8–40% (preferably 15–24%) phosphates, 10–80% (preferably 25–70%) flour, and 5–35% (preferably 14–22%) chloride salts, based on the weight of the non-aqueous ingredients of the aqueous solution. In particularly preferred aqueous solutions, the phosphates are 2–10% (preferably 5–7%) monocalcium phosphate anhydrous, 2–10% (preferably 5–7%) potassium tripolyphosphate, and 4–20% (preferably 5–10%) sodium tripolyphosphate, based on the weight of the non-aqueous ingredients of the aqueous solution, and the chloride salts are 3–25% (preferably 10–15%) sodium chloride and 2–10% (preferably 4–7%) potassium chloride, based on the weight of the non-aqueous ingredients of the aqueous solution.

The preferred flour is rice flour, although corn, wheat and soy flour may also be used. The gelatin preferably has a bloom of at least 20, although other blooms may also be used. While the carrageenan serves as both a moisturizer and a thickener, the aqueous solution preferably additionally contains an optional thickener selected from the group consisting of pectin, carboxymethylcellulose and methylcellulose. Where the meat is beef, pork or lamb (as opposed to, for example, chicken), the aqueous solution may additionally contain an optional enzyme, such as papain (from pineapple or papaya), protease, or the like.

The meat and the aqueous solution are preferably intimately contacted by tumbling. Tumbling may be performed at a temperature of 0°–30° C. (preferably 0°–10° C.) for a period of 30–180 minutes (preferably 60–90 minutes) at atmospheric pressure or for a period of 5–20 minutes (preferably 10–15 minutes) under vacuum ($-20$ to $-25$ in Hg). Depending upon the particular process that will be used to effect intimate contacting of the meat and the aqueous mixture, different temperatures and times may be preferred.

The intimate contacting of the meat and the aqueous solution continues until the water gain in the meat is at least 8% of the initial weight of the meat. Tumbling, injecting, soaking or the like to achieve a water gain of 12–15% of the initial weight may generally be accomplished in sixty minutes, with even higher water gains generally being accomplished with longer steps. As microwave heating in a household oven usually results in a 20–50%, or even greater, weight loss (as evaporated moisture) in fibrous fresh meat products, depending on the various cooking conditions (e.g., E-field strength, time, food, size, shape, etc.), the "water gain" step prior to microwave cooking anticipatorily compensates to at least some degree for such subsequent microwave-caused water loss.

The first or "water gain" step is often referred to as a "tumbling" step, deriving its name from the typical manner of intimately contacting with the meat with an aqueous solution according to the present invention. However, those skilled in the art will appreciate that, while tumbling is a preferred method of intimately contacting the meat with an aqueous solution, other process steps which result in intimate contacting of the meat with the aqueous solution may be employed—for example, injecting, soaking, spraying, dipping, or the like.

Surprisingly, for reasons which are not completely understood, the "water gain" step by itself—even if not followed by a "coating" step—is sufficient to substantially reduce or eliminate bumping during subsequent microwave cooking of the meat. In any case, the "water gain" step by itself results in an improvement in the microwaved product since it compensates for some of the moisture loss which naturally occurs during microwave cooking and reduces or eliminates the presence of "hot" spots which are produced by bumping and normally result in dry, tough parts within the meat.

The Coating Step

However, in order to achieve the best results, the preferred embodiment of the present invention includes a second or "coating" step wherein a dry, powdery coating agent including starch, protein and optional flavoring is applied to the meat. During subsequent microwave cooking of the meat, the coating agent forms a starch-and-protein cross linked continuous skin-like film which controls the heating rate and the microwave penetration depth so that the microwave energy absorption (and thus the temperature of the meat) is at least initially higher at the film than in the interior of the meat. The film thus protects the food itself from being dried out internally.

The starch of the coating agent is preferably selected from the group consisting of flour, pregelled starch, and combinations thereof. The flour is preferably rice flour, although corn, wheat and soy flour may also be used. The pregelled starch is preferably a pregelled corn starch, the term "pregelled starch" as used herein encompassing instant starch. A preferred coating agent includes 10–30% (preferably 10–15%) flour and 3–15% (preferably 5–8%) pregelled starch.

The protein of the coating agent is preferably selected from the group consisting of egg albumen, isolated vegetable protein and combinations thereof. It will be appreciated, however, that protein such as milk protein, corn protein, gelatin, and egg white powder (dried egg albumen) may be used instead of the egg albumen. The isolated vegetable protein is preferably isolated soy protein, but isolated rice, wheat or corn protein may also be used. A preferred coating agent includes about 10–25% (preferably 10–20%) egg albumen and 5–20% (preferably 10–15%) isolated vegetable protein.

It is highly preferred that the optional flavoring, when present, includes a chloride salt, such as sodium or potassium chloride, although this is not essential. The flavoring preferably also includes a sugar, such as fructose or dextrose, although other sugars (such as sucrose, maltose, maltodextrin, dextrose and galactose) may be included instead. The flavoring preferably includes lesser levels of spices, paprika and soy sauce powder, and red or black pepper, garlic powder and the like may also be employed.

The coating agent is in the form of a dry powder and has a particle size of 20–200 mesh (preferably 50–100 mesh), although even smaller particle sizes may be employed. The coating agent is preferably applied to the meat so as to achieve a 3–15% (preferably 4–6%) by weight pick-up, based on the meat (after the "water gain" step). The coating agent is applied to the meat by direct contact (for example, by tumbling) with the excess coating agent being removed by blowing to control the pick-up amount.

The coating agent—which is composed exclusively of food-grade ingredients—absorbs microwave energy at the applied surface (that is, the interface between the coating agent and the meat) faster than the interior of the meat and, under microwave cooking, forms a starch-and-protein crosslink continuous skin-like film. This skin-like film formed at the food surface during microwave heating reduces the microwave penetration depth and changes the heating rate in the entire food domain. Accordingly, at least initially, the temperature of the film is higher than that of the meat interior.

The use of starches other than flour and pregelled starch (e.g., dextrin, maltodextrin, amylose, amylopectin) and proteins other than egg albumen and isolated vegetable protein (e.g., soy protein, milk protein, etc.) may be employed in the coating agent of the present invention. However, the use of these other materials frequently results in the food having a mushy surface structure indicating that an undesirable high level of moisture is moving from the interior of the food to the food surface.

It will be appreciated that the coating agent may be used to artificially brown the meat where the flavoring includes as a coloring agent paprika or the like. This, of course, is not the actual or real browning which occurs due to the Maillard reaction between a reducing sugar and an amino acid during cooking at high temperature.

It will also be appreciated that the present invention does not utilize in the coating mix either acetic acid (to reduce the moisture loss) or acetate salt (to produce crispness) and does not require a batter system using multi-coating agents (including bread crumbs).

After the "water gain" step, the meat may be coated directly, with the outer surface of the meat optionally being further moisturized (for example, by a moisture spray), or it may be frozen and then (without defrosting) dipped in warm water prior to coating. Once the meat has been coated, it is preferably allowed sufficient time (about 2–5 minutes) for moisture equilibrium to be established between the coating and the meat surface. At this point, the coated meat may be refrigerated, frozen or directly microwaved.

It is theorized that the soaking or tumbling process results in the carrageenan, gelatin, flour, phosphates and the protein fiber of the meat forming a three-dimensional structure which binds water, with the salts controlling the pH at about 6 during microwave heating. When the "water gain" step is omitted, a 10–15% moisture loss is commonly observed when fresh meat is microwave cooked after the coating step according to the present invention. However, where the "water gain" step precedes the "coating" step, the water gain roughly compensates for the 10–15% moisture loss during microwave cooking. By way of contrast, conventional microwave cooking of fresh meat without either the "water gain" or "coating" steps is typically characterized by a 20–50% moisture loss.

EXAMPLE

To illustrate the efficacy of the present invention, four samples of chicken pieces were soaked for 60 minutes in preferred Formula A (as set forth below) and then coated with Formula B, cooked for various periods of time, and then taste-tested with the results indicated in Table I below. The "juicy" and "tender" taste found in each sample illustrates that the microwave heating pattern was significantly modified through use of the coating agent so that the E-field (microwave) energy is absorbed at the food surface. The maximum weight loss of any specimen was 8.4%, thus indicating the effect of the "water gain" step as anticipatorily compensating for the normal moisture loss during microwave cooking.

| Soaking Formula A (weight by gram) | | | |
|---|---|---|---|
| Carrageenan | 2.0 | Gelatin | 2.0 |
| Potassium Tripolyphosphate | 1.0 | Rice Flour | 10.0 |
| | | Water | 400.0 |
| Monocalcium Phosphate | 1.0 | | |
| Sodium Chloride | 2.0 | | |
| Coating Formula B (weight by gram) | | | |
| Fructose | 10.0 | Soy Sauce Powder | 1.0 |
| Sodium Chloride | 5.0 | Black Pepper | 0.5 |
| Rice Flour | 5.0 | Paprika | 1.0 |
| Pregelled Starch | 2.0 | Garlic Powder | 0.5 |
| Isolated Soy Protein | 3.0 | | |
| Egg Albumen | 5.0 | | |

TABLE I

| Soaking: | | | | |
|---|---|---|---|---|
| Initial solution pH: 6.14 | | | | |
| Initial Fresh Chicken Weight (4 pieces) | | | | 220.3 g |
| After | | | | |
| 30-minute soaking | | | | 231.2 g |
| 60-minute soaking | | | | 240.2 g |
| Final solution pH: 6.01 | | | | |

| Microwave Cooking (900 watts): | | | | |
|---|---|---|---|---|
| Sample No. | 1 | 2 | 3 | 4 |
| Initial Wt. (g) | 82.4 | 66.6 | 38.1 | 45.5 |
| With Coating (g) | 86.8 | 70.1 | 40.0 | 48.3 |
| Cooking Time (Sec) | 70 | 60 | 40 | 40 |
| After Cooking (g) | 79.5 | 65.6 | 37.7 | 46.2 |
| Wt. loss (%) | 8.4 | 6.4 | 5.6 | 4.4 |
| Taste: | Juicy Tender | Juicy Tender | Juicy Tender | Juicy Tender |

To summarize, the present invention provides a process for preparing a coated microwaveable meat which will be juicy and tender after microwave cooking and which also substantially reduces or eliminates "bumping". The present invention additionally encompasses a process for increasing the water content of meat by intimately contacting the meat with an aqueous solution of an appropriate pH and cation normality ratio.

Now that the preferred embodiments of the present invention have been described in detail, various modifications and improvements thereon will become readily apparent to those skilled in the art. Accordingly, the spirit and scope of the present invention is to be construed broadly and to be limited only by the appended claims, and not by the foregoing specification.

We claim:

1. A process for preparing coated microwaveable raw poultry meat which will be juicy and tender after microwave cooking, comprising the steps of:

(A) intimately contacting raw poultry meat with an aqueous solution having a pH of 5.0–9.0, a cation normality of 0.021–0.196 Na+, 0.010–0.086 K+ and 0.003–0.030 Ca++, and a cation normality ratio of Na+/K+/Ca++, of 2–10/1–6/1–4, the contact continuing until the water gain in the meat is at least 8% of the initial weight of the meat; and (B) thereafter applying to the raw meat a dry powdery coating agent, including starch in an amount of no more than 45% by weight and protein in an amount of no more than 45% by weight, until a 3–15% pick-up based on the weight of the meat is achieved;

whereby, during subsequent microwave cooking of the raw meat, the coating agent forms a starch-and-protein cross-linked continuous skin-like film which controls the heating rate and the microwave penetration depth so that microwave energy absorption is at least initially higher at the film than in the interior of the meat, and bumping and the resultant formation of dry, tough parts in the meat are reduced.

2. The process of claim 1 wherein the aqueous solution has a pH of 5.6–7.4, and a cation normality of 0.119–0.196 Na+, 0.055–0.086 K+, and 0.021–0.30 Ca++, and a cation normality ratio of Na+/K+/Ca++ of 7.0–9.5/2.0–3.5/1.0–2.5.

3. The process of claim 1 wherein in step A the solution contains non-aqueous ingredients including carrageenan, gelatin, phosphates, flour and chloride salts.

4. The process of claim 3 wherein in step A the aqueous solution contains about 2–8% by weight of non-aqueous ingredients including 5–20% carrageenan, 5–30% gelatin, 8–40% phosphates, 10–80% flour and 5–35% chloride salts, based on the weight of the non-aqueous ingredients of the aqueous solution.

5. The process of claim 4 wherein in step A the aqueous solution contains about 5% by weight of non-aqueous ingredients including 8–15% carrageenan, 10–15% gelatin, 15–24% phosphates, 25–70% flour and 14–22% chloride salts, based on the weight of the non-aqueous ingredients of the aqueous solution.

6. The process of claim 4 wherein in step A the phosphates are 2–10% anhydrous monocalcium phosphate, 2–10% potassium tripolyphosphate, and 4–20% sodium tripolyphosphate, based on the weight of the non-aqueous ingredients of the aqueous solution.

7. The process of claim 6 wherein in step A the phosphates are 5–7% anhydrous monocalcium phosphate, 5–7% potassium tripolyphosphate, and 5–10% sodium tripolyphosphate, based on the weight of the non-aqueous ingredients of the aqueous solution.

8. The process of claim 4 wherein in step A the chloride salts are 3–25% sodium chloride and 2–10% potassium chloride, based on the weight of the non-aqueous ingredients of the aqueous solution.

9. The process of claim 4 wherein in step A the chloride salts are 10–15% sodium chloride and 4–7% potassium chloride, based on the weight of the non-aqueous ingredients of the aqueous solution.

10. The process of claim 4 wherein in step A the flour is rice flour.

11. The process of claim 4 wherein in step A the gelatin has a bloom of at least 20.

12. The process of claim 4 wherein in step A the aqueous solution includes a thickener selected from the group consisting of pectin, carboxymethylcellulose and methylcellulose.

13. The process of claim 1 wherein in step A the meat and the aqueous solution are intimately contacted by tumbling.

14. The process of claim 1 wherein in step A the meat and the aqueous solution are intimately contacted by injection of the aqueous solution into the meat.

15. The process of claim 1 wherein in step A the meat and the aqueous solution are intimately contacted at a temperature of 0°–30° C. for a period of 30–180 minutes at atmospheric pressure.

16. The process of claim 15 wherein in step A the meat and the aqueous solution are intimately contacted at a temperature of 0°–10° C. for a period of 60–90 minutes at atmospheric pressure.

17. The process of claim 1 wherein in step A the meat and the aqueous solution are intimately contacted at a temperature of 0°–30° C. for a period of 5–20 minutes under vacuum.

18. The process of claim 17 wherein in step A the meat and the aqueous solution are intimately contacted at a temperature of 0°–10° C. for a period of 10–15 minutes under vacuum.

19. The process of claim 1 wherein in step B the starch of the coating agent is selected from the group consisting of flour, pregelled starch and combinations thereof, and the protein of the coating agent is selected from the group consisting of egg albumen, isolated vegetable protein and combinations thereof.

20. The process of claim 19 wherein in step B the coating agent includes by weight 10–25% egg albumen, 5–20% isolated vegetable protein, 10–30% flour, 3–15% pregelled starch, and 5–35% chloride salts.

21. The process of claim 20 wherein in step B the coating agent includes by weight 10–20% egg albumen, 10–15% isolated vegetable protein, 10–15% flour, 5–8% pregelled starch, and 10–25% chloride salts.

22. The process of claim 20 wherein in step B the flour is selected from a group consisting of corn, wheat, soy, and rice flour.

23. The process of claim 22 wherein in step B the flour is rice flour.

24. The process of claim 1 wherein in step B the coating agent is applied to the meat to achieve a 3–15% by weight pick-up based on the meat.

25. The process of claim 24 wherein in step B the coating agent is applied to the meat to achieve a 4–6% by weight pick-up based on the meat.

26. The process of claim 24 wherein in step B the coating agent is applied to the meat by direct contact and blowing to control the pick-up quantitatively.

27. The process of claim 1 wherein in step B the coating agent has a particle size of 20–200 mesh.

28. The process of claim 27 wherein in step B the coating agent has a particle size of 50–100 mesh.

29. A process for increasing the water content of raw poultry meat and reducing bumping, comprising the step of intimately contacting raw poultry meat with an aqueous solution having a pH of 5.0–9.0, a cation normality of 0.021–0.196 $Na^+$, 0.010–0.086 $K^+$ and 0.003–0.030 $Ca^{++}$, and a cation normality ratio of $Na^+/K^+/Ca^{++}$ of 2–10/1–6/1–4, the contact continuing until the water gain in the raw meat is at least 8% of the initial weight of the meat, whereby bumping and the resultant formation of dry, tough parts in the meat are reduced during subsequent microwave cooking of the raw meat.

30. The process of claim 29 wherein the aqueous solution contains about 2–8% by weight of non-aqueous ingredients including 5–20% carrageenan, 5–30% gelatin, 8–40% phosphates, 10–80% flour and 5–35% chloride salts, based on the weight of the non-aqueous ingredients of the aqueous solution.

31. The process of claim 29 wherein the meat and the aqueous solution are intimately contacted at a temperature 0°–30° C. for a period of 30–180 minutes at atmospheric pressure.

32. The process of claim 29 wherein the aqueous solution has a pH of 5.6–7.4, a cation normality of 0.119–0.196 $Na^+$, 0.055–0.086 $K^+$, and 0.021–0.030 $Ca^{++}$, and a cation normality ratio of $Na^+/K^+/Ca^{++}$ of 7.0–9.5/2.0–3.5/1.0–2.5.

33. A process for preparing coated microwaveable raw poultry meat which will be juicy and tender after microwave cooking, comprising the step of:
(A) applying to raw poultry meat a dry, powdery coating agent, including starch in an amount of not more than 45% by weight and protein in an amount of not more than 45% by weight, until a 3–15% pick-up based on the weight of the meat is achieved;
whereby, during subsequent microwave cooking of the raw meat, the coating agent forms a starch-and-protein cross-linked continuous skin-like film which controls the heating rate and the microwave penetration depth so that microwave energy absorption is at least initially higher at the film than in the interior of the meat, and bumping and the resultant formation of dry, tough parts in the meat are reduced.

34. The process of claim 33 wherein the starch of the coating agent is selected from the group consisting of flour, pregelled starch and combinations thereof, and the protein of the coating is selected from the group consisting of egg albumen, isolated vegetable protein and combinations thereof.

35. The process of claim 33 wherein the coating agent includes 5–15% chloride salts, 5–20% isolated vegetable protein, 10–30% flour, and 3–15% pregelled starch.

36. A process for preparing coated microwaveable raw poultry meat which will be juicy and tender after microwave cooking, comprising the steps of:
(A) at a temperature of 0°–30° C., intimately contacting raw poultry meat with an aqueous solution having a pH of 5.0–9.0, a cation normality of 0.021–0.196 $Na^+$, 0.010–0.086 $K^+$ and 0.003–0.030 $Ca^{++}$, and a cation normality ratio of $Na^+/K^+/Ca^{++}$ of 2–10/1–6/1–4, the aqueous solution containing about 2–8% by weight of non-aqueous ingredients including 5–20% carrageenan, 5–30% gelatin having a bloom of at least 20, 2–10% anhydrous monocalcium phosphate, 2–10% potassium tripolyphosphate, 4–20% sodium tripolyphosphate, 10–80% rice flour, 3–25% sodium chloride, and 2–10% potassium chloride based on the weight of the non-aqueous ingredients of the aqueous solution, the contact continuing until the water gain in the meat is at least 8% of the initial weight of the meat; and
(B) thereafter applying to the raw meat a dry, powdery coating agent including by weight 10–25% egg albumen, 5–20% isolated vegetable protein, 10–30% flour, 3–15% pregelled starch, and 5–35% chloride salts, the coating agent being applied to the raw meat to achieve a 3–15% by weight pick-up based on the meat, the coating agent having a particle size of 20–200 mesh;

whereby, during subsequent microwave cooking of the raw meat, the coating agent forms a starch-and-protein crosslinked continuous skin-like film which controls the heating rate and the microwave penetration depth so that microwave energy absorption is at least initially higher at the film than in the interior of the meat, and bumping and the resultant formation of dry, tough parts in the meat are reduced.

37. A process for increasing the water content of meat, comprising the step of raw poultry intimately contacting raw poultry meat with an aqueous solution having a pH of 5.0–9.0, a cation normality of 0.021–0.196 $Na^+$, 0.010–0.086 $K^+$ and 0.003–0.030 $Ca^{++}$, and a cation normality ratio of $Na^+/K^+/Ca^{++}$ of 2–10/1–6/1–4, the aqueous solution containing about 2–8% by weight of non-aqueous ingredients including 5–20% carrageenan, 5–30% gelatin, 8–40% phosphates, 10–80% flour and 5–35% chloride salts, based on the weight of the non-aqueous ingredients of the aqueous solution, the contact continuing until the water gain in the raw meat is at least 8% of the initial weight of the meat, whereby bumping and the resultant formation of dry, tough parts in the meat are reduced during subsequent microwave cooking of the raw meat.

38. The process of claim 37 wherein the aqueous solution has a pH of 5.6–7.4, a cation normality of 0.119–0.196 $Na^+$, 0.055–0.086 $K^+$, and 0.021–0.030 $Ca^{++}$, and a cation normality ratio of $Na^+/K^+/Ca^{++}$ of 7.0–9.5/2.0–3.5/1.0–2.5.

39. A process for preparing coated microwaveable raw poultry meat which will be juicy and tender after microwave cooking, comprising the step of:
(A) applying to raw poultry meat a dry, powdery coating agent having a particle size of 20–200 mesh and including 5–35% chloride salts, 5–20% isolated vegetable protein, 10–30% flour, and 3–15% pre-gelled starch, the coating agent being applied to the raw meat to achieve a 3–15% by weight pick-up based on the meat;

whereby, during subsequent microwave cooking of the raw meat, the coating agent forms a starch-and-protein crosslinked continuous skin-like film which controls the heating rate and the microwave penetration depth so that microwave energy absorption is at least initially higher at the film than in the interior of the meat and bumping and the resultant formation of dry, tough parts in the meat are reduced.

* * * * *